Oct. 22, 1957     D. H. LEE     2,810,785
CODE TYPER
Filed Oct. 19, 1955     2 Sheets-Sheet 2
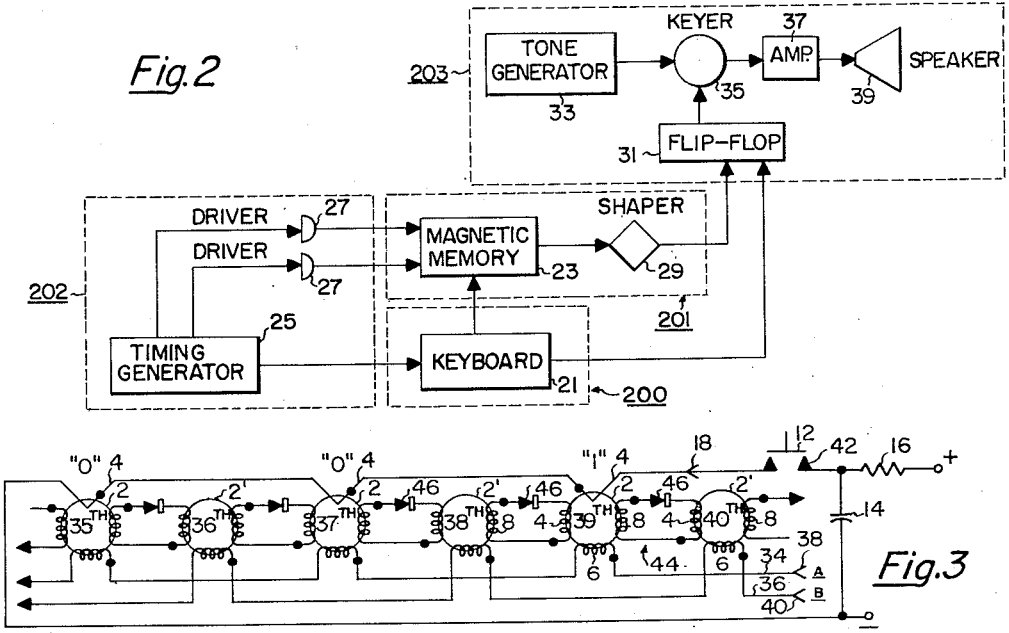
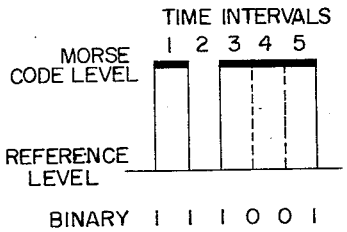
Fig.5
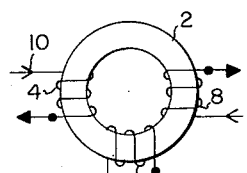
Fig.4
Fig.6
INVENTOR.
DONALD H. LEE
BY George Baron
ATTORNEY

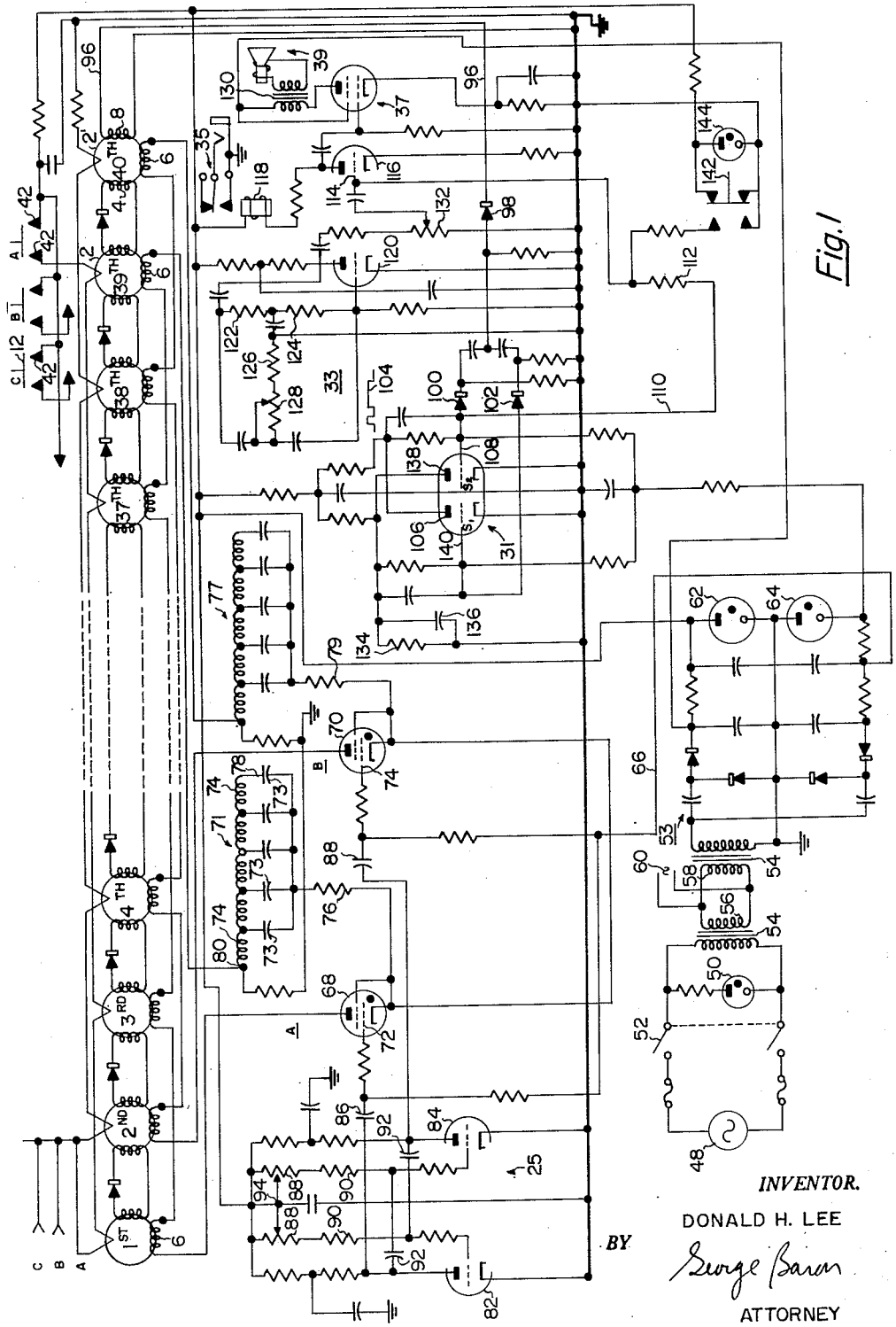

United States Patent Office 2,810,785
Patented Oct. 22, 1957

2,810,785

CODE TYPER

Donald H. Lee, Philadelphia, Pa., assignor to Burroughs Corporation, Detroit, Mich., a corporation of Michigan Application October 19, 1955, Serial No. 541,365

10 Claims. (Cl. 178—79)

This invention relates to the field of communication of intelligence and more particularly to a method and instrumentality for transmitting code signals automatically by pressing the correct key on a typewriter-like keyboard.

When a human operator produces the successions of dots and dashes of code communications, there is a vulnerability to error from human fatigue and distraction. Additionally, each operator unconsciously adds his own physical characteristics to his keying so that skilled intercept operators can identify operators through their personal differences in keying. Such personal operator characteristics "fingerprint" the operator, permitting the receiver to identify the person sending the coded messages. This may be undesirable, particularly in military transmissions, where the enemy can use the distinctive sending style of an operator to identify the location of troop units.

Furthermore, in prior art devices that do employ means for automatically transmitting coded signals utilizing a typewriter-like keyboard, filament-heated vacuum tubes are employed as the means for storing and transmitting the coded signals. The disadvantages of vacuum tubes, such as their inability to retain information in the event of power failure, their reliance on high power consumption to store and transmit information, and the added problem of cooling the filament-heated tubes, make them undesirable as elements in a code transmitter, particularly where reliability and long-life of the transmitter are desirable.

The present invention relies upon rectangular hysteresis loop materials, such as certain nickel-iron alloys, molybdenum permalloys, and ferrites, as storage elements in a code transmitter utilizing a typewriter-like keyboard and carriage. The reliance upon such rectangular hysteresis loop materials as storage elements will result in attaining a more efficient, more compact, and more reliable codetyper than was heretofore attained. How the use of such rectangular hysteresis loop characteristic materials attains these ends will be unfolded as the invention is more specifically described hereinafter.

It is an object of this invention to provide a code typer which automatically transmits a coded signal when the operator presses the correct key on the typer, said coded signal being transmitted in a manner determined by the parameters of the transmitter and not by the personal touch of the transmitter.

A further object is to provide a code transmitting machine utilizing materials having rectangular hysteresis loop characteristics, such as bistable magnetic cores, in a novel and unusual manner, so as to attain advantages in such a machine heretofore unrealized.

Yet another object is to provide a code machine which may have particular utility as a means for teaching standard codes, such as the International Morse, or Continental Code, to beginners, yet not require skilled personnel as instructors.

In accordance with the teaching of the present invention, the storage devices will consist of magnetic cores of the type disclosed in pp. 49–54 of the January 1950 issue of the "Journal of Applied Physics" on the subject of "Static magnetic storage and delay line" by An Wang and Way Dong Woo. The aforementioned article by An Wang and Way Dong Woo disclose the feasibility of using magnetic cores with a rectangular hysteresis loop as information storage elements wherein the information to be stored can be represented in binary form. The binary digit "one" state is stored as a positive residual flux whereas the binary digit "zero" state is stored as a residual flux in the opposite direction. When a negative field is applied to the core in order to interrogate the latter so as to determine the state of the core, a large voltage is induced in an output winding associated with the core if the core were in its "one" state, and a negligible voltage is induced in such output winding if the core were in its "zero" state.

The negligible induced voltage obtained when a core in its "zero" state is driven further towards its "zero" state is a noise pulse, such noise voltage pulses being of lesser amplitudes as the cores attain a more rectangular hysteresis loop.

The outputs obtained from the bistable magnetic cores of a magnetic shift register are in the form of voltage pulses, and means must be provided for converting such voltage pulses to D. C. voltage levels, since D. C. levels as distinct from the presence or absence of a voltage pulse, can be more readily converted to the dot-dash audible signals that are employed in the transmission of coded messages. Means must also be provided to vary the speed at which such messages can be sent. How such means are provided and how the aforementioned objects are attained will become evident from consideration of the following description of an illustrative embodiment of the invention, taken in conjunction with the appended drawings in which:

Figure 1 is a schematic electrical circuit of an embodiment of the codetyper device utilizing bistable magnetic cores as information storage elements;

Figure 2 is a diagram, in block form, of the components which comprise the magnetic memory codetyper;

Figure 3 is an electrical schematic of a portion of the magnetic shift register utilized for read-in and read-out of coded signals in binary form;

Figure 4 is a detailed showing of a magnetic core of the shift register of Figure 3 and its associated windings;

Figure 5 is a symbolic representation of the conversion of the Morse code letter "A" notation to the binary code notation of that letter; and Figure 6 expresses the International Morse or Continental Code in binary form.

Before describing in detail the magnetic memory codetyper, attention is drawn to Figure 2 of the drawings wherein is shown the invention broken down into four categories, namely, a coded input circuit 200, a memory storage and translation system 201, a control unit 202, and a coded output circuit 203. The input unit will comprise a keyboard 21 with an arrangement similar to a typewriter which will contain all the letters of the alphabet, numerals, common punctuation marks and special codes peculiar to telegraphy such as the error and the double dash. Such indicia are shown in the left hand column of Figure 6. The person operating the keyboard 21 will, upon depressing the appropriate key, store the corresponding binary coded Morse symbol in the proper cores of the magnetic memory 23.

The control unit 202 synchronizes the operation of the magnetic memory 23 with the operation of the keyboard 21 through a timing generator 25. The timing generator 25 not only synchronizes the entire electrical system of the codetyper but also permits variations in the speed of transmitting coded signals. It is seen that the timing generator 25 is coupled to current drivers 27 which supply the power pulses to the windings associated with the magnetic storage cores of the magnetic memory unit 23. The output voltage signals from the magnetic memory unit 23 are in the form of voltage pulses which are modified and shaped by a pulse-shaping circuit 29 before such output voltage pulses are fed into output circuit 203. The pulse-shaping circuit 29 will yield substantially unidirectional pulses which operate a flip-flop 31, the outputs of said flip-flop 31 serving to modify the audible signal produced by tone generator 33 or to modify the audible signal of the keyer 35. The amplifier 37 and speaker 39 are conventional self-explanatory elements in the coded output circuit 203.

*Memory storage and translation system*

The basic memory cell in which will be stored the letters, numerals, punctuation marks, etc. in binary form is shown in Figure 4 as a magnetic core 2 made of a ferromagnetic material such as a nickel-alloy, or a molybdenum Permalloy. It is understood that core 2 could be in the form of a rod or a printed ferromagnetic element and that any ferromagnetic material having a substantially rectangular hysteresis loop could be substituted for the core 2 shown. Wound about core 2 are read-in winding 4, clearing or interrogation winding 6, and output winding 8. The conventional "dot" notation of such windings 4 to 8 calls for a magnetic core 2 being switched to its "one" state if current enters the undotted terminal of a winding. Thus current entering winding 4 in the direction of arrow 10 will switch magnetic core 2 to its "one" state, whereas current entering a winding through the dotted terminal of said winding, such as winding 6, will switch the core associated with said winding to its "zero" state.

In Figure 3 there is shown a portion of the magnetic shift register which will store the coded indicia in binary form. In order to introduce the appropriate Morse symbol into a binary code, the push button 12 is depressed. The capacitor 14, which is normally charged to supply potential through resistor 16, discharges into read-in winding 4 which threads through all the magnetic storage cores 2. Since the symbol that is the longest representation in code, for example, the comma, will require twenty binary bits in order to be correctly represented, a minimum of twenty storage cores is needed to adequately encompass the full range of indicia to be transmitted. In the magnetic memory storage and translation unit, of which only a fragment is shown in Figure 3, magnetic cores 2' are storage or delay means for temporarily storing the information read-out of an immediately preceding core 2 before transferring such information to the next succeeding core 2. Thus, in the example given in Figure 3, a depression of key 12 will cause current to flow in read-in winding 4 in the direction of arrow 18 so as to store a "one," a "zero," and another "zero" in alternate adjacent cores. It is to be understood that the depression of key 12 will effect more cores 2 than are shown in the example set out in Figure 3, but for the sake of simplifying the drawing only three storage cores 2 and three companion delay cores 2' are shown. Since the memory storage and translation system that is utilized in the instant codetyper includes forty bistable magnetic cores, the core 2' on the most extreme right of Figure 3 will be considered, for illustrative purposes, to be the fortieth core in the array, the core 2 immediately preceding said fortieth core is the thirty-ninth core, the one immediately to the left of that is the thirty-eighth core, etc.

Initially all information is read-into the odd numbered magnetic cores by depression of the appropriate key 12. Such stored binary information is then read out of the cores by shifting the information to the right along adjacent cores until the binary information is read out of the shift register to the coded output circuit 203. Such shifting of information is carried out by means of shift windings 6, wherein one group of shift windings is threaded through all the odd-numbered cores 2 and that group is associated with shifting pulses that emanate from source A. The second group of shifting pulses emanate from source B and are threaded through the even-numbered magnetic cores 2'. Sources A and B are generators of periodic or cyclic current pulses, occurring at different times, which enter bus lines 34 and 36 respectively, in the direction of arrows 38 and 40. Such periodic current pulses or interrogation pulses will cause current to flow through the bus lines 34 and 36 so as to enter the dotted terminal of each winding 6. Consequently any magnetic core that is in its "one" state will be switched to its "zero" state, and a magnetic core already in its "zero" state will remain substantially unaffected by such interrogation pulses.

In the example set out in Figure 3, the depression of key 12 has caused a "one" to be stored in the thirty-ninth core, a "zero" in the thirty-seventh core, and a "zero" in the thirty-fifth core. Almost as soon as the key 12 rises from its contacts 42, the interrogation pulses alternately course through bus lines 34 and 36 in order to interrogate such cores. Consequently, the passage of interrogation current through bus line 34 in the direction of arrow 38 will cause the "one" stored in the thirty-ninth core to be transferred to the fortieth core via the transfer loop 44 which couples the output winding 8 of the thirty-ninth core to the input winding 4 of the fortieth core with a diode 46 so as to permit flow of information from left to right. The transfer is effected because the interrogation current switches the thirty-ninth core to its "zero" state. During this switching of the thirty-ninth core, an induced voltage is developed in the output winding 8 of the thirty-ninth core of such polarity that a current of sufficient amplitude to switch the fortieth core to its "one" state flows around transfer loop 44 in the low forward impedance direction of the diode 46.

The "zero" in the thirty-seventh core is transferred to the thirty-eighth core via the transfer loop coupling such cores and the "zero" in the thirty-fifth core is transferred to the thirty-sixth core via their associated transfer loop, although such "transfer" is in reality the absence of an output pulse from the thirty-seventh core. At some instant later, interrogation pulses B cause current to flow in bus line 36 in the direction of arrow 40 so as to switch the even-numbered cores to the next adjacent odd-numbered core in the array. In order to prevent the stored information from being shifted prematurely or before the key 12 has moved away from contacts 42, the current flowing into read-in windings 4 is made sufficiently large to override the effects of the periodic interrogating pulses that are cyclically causing current flow alternately through windings 6.

It is also noted that when current is flowing through the dotted terminal of a clearing winding 6, such as in the clearing winding 6 of the thirty-ninth core, not only is a voltage induced in the output winding 8 of the thirty-ninth core when the latter switches, but a voltage is also induced in the input winding 4 of such core. The voltage induced in winding 4 would cause current to flow through the transfer loop to the left of the thirty-ninth core into the undotted terminal of the output winding of the thirty-eighth core. Such reverse or backward flow of information is undesired and can be overcome by controlling the number of turns for each winding on each core. In the instant case, in order to avoid such spurious transfer of information, the number of turns on the output winding 8 of a core should exceed the number of turns on the input winding 4 of the next adjacent core. An exemplary number of turns would be seven turns for input or read-in winding 4, nineteen turns for interrogation winding 6, and twenty-five turns for output winding 8.

Code input circuit

In Morse code, indicia are represented by various combinations of dot and dash signals. A dash is equal to three dots in time duration and the spacing between the signals forming the same letter is equal to the time duration of one dot. Thus, as is shown in Figure 5, the Morse code representation for the letter "A" is a dot and a dash and an interval between the dot and the dash equal to the time it takes to make a dot. Thus the letter "A" requires five time intervals for its representation in Continental or International Morse Code and the letter "J," being composed of a dot followed by three dashes, requires thirteen time intervals for its representation.

Since the output signals from a magnetic shift register memory are in the form of voltage pulses instead of D. C. levels, such voltage pulses must be modified to put them into useable form. The binary coding system is based on a change in level, i. e., a "one" exists wherever there is a change in D. C. level and a "zero" exists wherever there is no change in level. Consequently, the letter "A," represented in Morse code as a dot-space-dash would be represented in the binary code as two changes in D. C. level for the dot, and the dash is represented by a change in D. C. level, followed by no changes in D. C. level for two time intervals, and a change in D. C. level for the fifth time interval. Essentially a dot would be represented by the binary code 11 and a dash by the binary code 1001. As is seen in Figure 6, the "C" is represented in binary code by 1001 11 1001 11, and the letter "S," three dots in the International Morse or Continental code, is represented by the combination 111111 in binary code. The manner in which the information cores 2 are threaded with read-in winding 4 is dictated by the binary-coded Morse, with reading-in taking place from the 39th storage core to the 1st storage core, and information being read-in by depression of the appropriate push-button 12. As is seen in the code table of Figure 6, the letter "E" requires only two cores, the 39th and 37th, for its entry into the magnetic shift register whereas the comma (,) requires the employment of all the available storage cores for its entry into the magnetic shift register. It is evident that an even number of cores 2 are required for storing a character or symbol, two cores for a dot and four cores for a dash.

Control circuit for shift register

Once the desired character or symbol has been selected, it is necessary to translate the binary-coded input into changes in D. C. level and to utilize these changes in D. C. level to produce the universally recognizable dot-dash sounds of Morse code.

Figure 1 shows the electrical circuitry for carrying out such translation. A power supply for the magnetic code-typer will comprise an A. C. source of electrical energy 48 which is stabilized by voltage regulator tube 50 when switch 52 is closed. The regulated A. C. supply is transformer coupled to a conventional voltage doubler circuit 53 via transformer 54. Two filament transformers 56 and 58 are connected to a low voltage A. C. supply 60 for supplying heating current to voltage regulator tube 50 as well as to the half-wave rectifier tubes 62 and 64 in the voltage doubler circuit 53.

The output voltage of the voltage doubler circuit 53 is applied through conductor 66 to the grids of thyratron tubes 68 and 70. The thyratrons 68 and 70 are biased so as to be extinguished, but each becomes conductive when a trigger pulse is applied to the grid 72 of tube 68 or grid 74 of tube 70. When tube 68 conducts, driving current passes through interrogation windings 6 associated with the odd-numbered cores 2 in the magnetic shift register. Such driving current would form the A current pulses that simultaneously drive the odd-numbered cores 2 to their "zero" states in the process of shifting information to the right along the magnetic shift register. In a similar manner, when tube 70 conducts, driving current pulses forming the B current pulses flow through the interrogation windings 6 associated with the even numbered cores 2 in order to continue the process of shifting information along to the right in the magnetic shift register. The A and B interrogation pulses appear at different times because information must be extracted from a core before new information is read into the core. The even-numbered cores 2' provide the necessary delay in the process of advancing information from one core to another. The two sets of interrogation pulses A and B provide the proper alternation of reading out information stored in the odd-numbered cores to the even-numbered cores using the A current pulses, and the subsequent reading out of such transferred information from the even-numbered cores to the odd-numbered cores using the B set of interrogation current pulses.

In order for the stored binary information to advance properly, the duration and amplitude of the interrogation pulses A and B must be controlled. This control is realized with the aid of a delay line 71 whose capacitors 73 are charged to full supply potential through inductances 74 and isolation resistor 76 when thyratron 68 is not conducting. When a trigger pulse is applied to grid 72 to override the cut-off bias of thyratron 68, tube 68 conducts. Since the internal impedance of thyratron 68 is very low compared with that of isolating resistor 76, the capacitors 73 of delay line 71 discharge through the interrogation windings 6 wound about the odd-numbered cores of the shift register. At the instant that thyratron 68 fires, the delay line circuit is momentarily terminated by the impedance of the shift windings 6 and resistor 76. A wave starts down the delay line 71 and is reflected without inversion at the open end 78 of the delay line 71. When the reflected wave reaches the input end 80 of the delay line 71, the capacitors 73 are completely discharged, extinguishing the thyratron 68. Therefore, the time required for the capacitors 73 to discharge completely is twice the delay interval of delay line 71. Accordingly, the duration and amplitude of the driving current pulses A are controlled respectively by the delay and impedance of delay line 71. After thyratron 68 is extinguished, the capacitors 73 are again charged through resistor 76 and inductances 74 in preparation for the next cycle of operation. In like manner, a delay circuit 77 cooperates with thyratron 70 to produce the B set of controlled driving current pulses for interrogating the even-numbered magnetic cores 2'.

The delay lines 71 and 77 for thyratron drives 68 and 70 have been designed, in one working embodiment, to generate a driving current pulse of approximately fifteen microseconds in duration. The terminating resistors 76 and 79 are chosen to have a value about one-third that of the characteristic impedance of their corresponding delay line so that the reflected wave that reaches the plate of the thyratron should cause the plate to momentarily actually swing negative with respect to its cathode so as to further assure the rapid extinction of the thyratron.

Besides controlling the amplitude and duration of the driving current pulses A and B, it is desirable to control the frequency of such current pulses for a given time interval. Such control is realized by employing a timing generator 25 which comprises two triodes 82 and 84 connected to operate as a free-running multivibrator, where conduction of tube 82 is accompanied by cut-off of tube 84, and vice versa. The flip-flop effect of the free-running multivibrator is utilized to alternately trigger thyratrons 68 and 70. Grid 72 of tube 68 is coupled via capacitor 86 to the plate of triode 82 whereas grid 74 of tube 70 is coupled via capacitor 88 to the plate of triode 84. How often thyratrons 68 and 70 are fired is determined by the frequency at which the free-running multivibrator operates. Such frequency, in turn, is determined by the RC time constants in the grid circuits of triodes 82 and 84. Since resistors 88 and 90 and capacitors 92 affect the RC time constant of the grid circuits for the multivibrator, one changes the time constant by varying the resistance of resistors 88 through movement of potentiometer arm 94.

Consequently it is seen how delay lines 71 and 77 are employed to vary the duration and amplitude of the interrogation pulses A and B that are alternately applied to binary storage cores 2 and 2′, and how the timing generator 25 is employed to vary the speed of such interrogation pulses, which in turn determines the speed at which the binary-input code is read out of the magnetic shift register.

Coded output circuit

In Figure 1, the output voltage pulses that appear across the output winding 8 of the fortieth binary core are fed into that portion of the codetyper which must convert such output voltage pulses into the sequential dot-dash audible signals of Morse code. Whenever the fortieth core is in its "one" state prior to being interrogated by a clock or interrogating pulse from the B group of clock pulses, a negative pulse appears across the output winding 8. If the fortieth core were in its "zero" state when it was being interrogated, a negligible noise pulse will appear across the output winding 8. One normally types words at a rate of 100 words per minute because such speed is consonant with the speed at which one can receive Morse code. But by the selection of the proper driving circuit for the magnetic cores, one can attain a speed of the order of 100,000 words a minute. Consequently there will be no overlapping of signals being transmitted by the codetyper because the speed of read-out of information in the cores is of the order of 1000 times the speed of keying information into the cores.

Assume that the key 12 corresponding to the first letter "A" of the alphabet has been depressed. As is seen in the code table of Figure 6, the letter "A" is coded as 111001 in binary code. Thus the read-in winding 4 that is in series with the key 12 that corresponds to letter "A" is threaded through the odd-numbered storage cores 2 so that a "one" is stored in the thirty-ninth core, a "one" in the thirty-seventh core, a "one" in the thirty-fifth core, a "zero" in the thirty-third core, a "zero" in the thirty-first core, and a "one" in the twenty-ninth core. As long as the "A" key is depressed, as was noted hereinbefore, the read-in current flowing through windings 4 overrides the constantly recurring driving current that influences the same cores through windings 6. As soon as pressure is removed from key 12 so that contact with electrical contacts 42 is broken, the interrogation pulses become effective and the information, namely 111001, is read out of the shift register.

As the binary word 111001 is read out of the shift register, conductor 96 connected to a terminal of output winding will carry, for six units of time, three successive negative pulses followed by two no pulse periods and ending with a negative pulse. By means of clipping diode 98 and gating diodes 100 and 102, flip-flop 31 is triggered only in response to negative pulses appearing in conductor 96, or what is the same thing in substance, only by the presence of a "one" in the fortieth magnetic core prior to interrogation of that core. As a result, every negative voltage pulse appearing at the output winding 8 of the fortieth core will change the state of flip-flop 31. Thus, for the letter "A" (111001), if stage $S_1$ of the flip-flop 31 is normally conducting, the first "one" of the binary code for the letter "A" will trigger stage $S_2$ of the flip-flop 31 into conduction and cut off stage $S_1$. The record "one" triggers $S_1$ into conduction but cuts off $S_2$. The third "one" reverses the states of the flip-flop 31 again by triggering $S_2$ into conduction and cutting off $S_1$.

The two ensuing "zero" voltage pulses are negligible and they do not affect the state of the flip-flop 31 so that $S_2$ remains conductive and $S_1$ is cut off during the two "zero" periods. The occurrence of the last "one" as a negative pulse carried by conductor 96 returns stage $S_1$ of flip-flop 31 to conductivity and cuts off stage $S_2$. The D. C. level waveform 104 appearing at plate 106 of flip-flop 31 is a correct representation of the letter "A." The corresponding D. C. level at grid 108 of stage $S_2$ of flip-flop 31 is fed through conductor 110 and resistor 112 to the grid 114 of triode 116, so that the grid 114 bias varies in accordance with the dot-dash sequence of the Morse code.

The novel codetyper utilizes both an audible indicator of the indicia selected at the typewriter-like keyboard by the operator as well as a keyer for transmitting such selected indicia to another station. Triode 116 is in series wih relay 118 and when grid 114 is driven positive by the positive excursions of plate 106 of flip-flop 31 triode 116 conducts to supply magnetizing current to relay 118. Keyer 35 is actuated by relay 116 and such keyer 35 can be readily connected to a conventional code transmitter.

Where it is desired to obtain an audible output of the Morse code whose tone and volume can be controlled, a tone generator 33 comprising a triode amplifier 120 and a twin-T plate-to-grid feedback network that includes fixed resistances 122, 124, and 126 and variable resistor 128 is employed. The pitch of the tone generator 33 is varied by varying the null frequency of said twin-T plate-to-grid feedback network. Such variation is readily attained by changing the value of variable resistor 128.

The tone generator 33 operates continuously and its output is coupled via triode amplifier 116 to output amplifier 37 so that the grid bias of output amplifier 37 varies in accordance with Morse code dot-dash sequences. Consequently such variations are transmitted to speaker 39 via the transformer coupling 130. The volume of tone generator 33 is varied by changing the value of variable resistor 132 that is in the grid 114 circuit of triode amplifier 116. If triode tube 116, which operates keyer 35, is connected to the wrong grid of flip-flop 31, the keyer 35 would become a "normally on" key instead of a "normally off" key. To assure that the keyer 35 is operated correctly, an R-C network comprising resistor 134 and capacitor 136 is placed in the plate 138 circuit of the Morse code-forming flip-flop 31 to create sufficient unbalance in current flow through both stages $S_1$ and $S_2$ of the flip-flop 31 so that one side, namely, stage $S_1$, always conducts first whenever full plate voltage is applied to the flip-flop 31 after release of a push button 12. Therefore the voltage at the grid 140 of the companion stage $S_1$ is of the correct level to bias the triode or keyer amplifier 116 to cut-off until the flip-flop 31 is switched by the first bit of information shifted out of the fortieth core of the magnetic shift register.

An optional feature of the present codetyper would be a test circuit comprising push button 142 and indicating light 144, as shown in Figure 1, for testing whether or not signals from flip-flop 31 are being fed into the tone circuit 33 or relay 118 circuit.

It is understood that the above described invention will have keys, similar to typewriter keys, protruding from an enclosure that houses the timing generator 25, magnetic memory 23, flip-flop 31 and other elements shown in Figures 1 and 2. The keys will be depressed by the person sending out coded messages. Controls for switching on power to the codetyper, for varying the speed of interrogating the information in the magnetic memory 23, or for varying the duration and amplitude of the interrogating pulses A and B, or for controlling the pitch and volume of the tone generator 33, or for testing the operation of certain components of the codetyper, such as test button 142, will be on a panel or face of the enclosure within ready reach of the person transmitting the coded message.

Accordingly, the present invention is a compact, rugged codetyper that can be employed either as a commercial transmitter or as an educational device for teaching Morse code to beginners without requiring a skilled operator to tap out the code.

What is claimed is:

1. A code typer for transmitting characters in coded form comprising an array of binary magnetic cores, keying means having a contactor for each character to be encoded, a winding associated with each contactor and threading a preselected group of cores in said array, means for supplying flux energy to said cores through said winding when said keying means is depressed to render said contactor electrically conductive so as to store either a "one" or a "zero" in each core of said preselected group, such character thus being represented in binary form in said array of cores, means for applying pulses to said array of cores for shifting said stored information along said array to produce output pulses corresponding to the order in which said "ones" and "zeros" were stored in said cores, means for varying the amplitude of said shifting pulses, and means for converting said output pulses to a sequence of audible tones, said sequence of tones being representative of the character selected by depression of said keying means.

2. A code typer as defined in claim 1 including means for varying the duration of said shifting pulses.

3. A code typer for transmitting characters in coded form comprising an array of binary magnetic cores, keying means having a contactor for each character to be encoded, a winding associated with each contactor and threading a preselected group of cores in said array, means for supplying flux energy to said cores through said winding when said keying means is depressed to render said contactor conductive so as to store either a "one" or a "zero" in each core of said preselected group, such character thus being represented in binary form in said array of cores, means for shifting said information along said array to produce output pulses corresponding to the order in which said "ones" and "zeros" were stored in said cores, the read-out of a "one" producing an output voltage pulse whereas the read-out of a "zero" does not produce an output voltage pulse, a bistable multivibrator, means for applying said output voltage pulse to said multivibrator to produce a changing D. C. level at an anode of said multivibrator, an amplifying circuit comprising a amplifier tube having a control grid, a tone generator producing audible signals in series with said amplifier, and means for applying said changing D. C. level to the grid of said amplifier tube to modify the audible signal.

4. A code typer for transmitting characters in coded form comprising an array of binary magnetic cores, keying means having a contactor for each character to be encoded, a winding associated with each contactor and threading a preselected group of cores in said array, a first means for supplying flux energy to said cores through said winding when said keying means is depressed to render said contactor electrically conductive so as to store either a "one" or a "zero" in each core of said preselected group, such character being represented in binary form in said array of cores, a second means for supplying flux energy for shifting said information along said array of cores, said second means being applied continuously to said array whereas said first means is applied only upon depression of said keying means, and means for supplying more flux energy to said cores via said first means than through said second means so that the shifting of stored information cannot begin until the keying means is withdrawn from said contactor.

5. A code typer for transmitting characters in coded form comprising an array of binary magnetic cores, keying means having a contactor for each character to be encoded, a winding associated with each contactor and threading a preselected group of cores in said array, means for supplying flux energy to said cores through said winding when said keying means is depressed to render said contactor conductive so as to store either a "one" or a "zero" in each core of said preselected group, such character thus being represented in binary form in said array of cores, means for shifting said information along said array to produce output pulses corresponding to the order in which said "ones" and "zeros" were stored in said cores, a bistable multivibrator having two conductive stages, each stage comprising an anode, cathode and a grid, means for applying said output pulses to said bistable multivibrator, and an R-C delay circuit coupled to one stage of said bistable multivibrator whereby the first of said output pulses will always trigger the same stage of said multivibrator.

6. A code typer for transmitting characters in coded form comprising a first array of binary magnetic cores and a second array of binary cores forming part of a magnetic shift register, keying means having a contactor for each character to be encoded, a winding associated with each contactor and threading a preselected group of cores in said first array, means for supplying flux energy to said first array of cores through said winding when said keying means is depressed to render said contactor electrically conductive so as to store either a "one" or a "zero" in each core of said preselected group, such character being represented in binary form in said array of cores, means for shifting said information along said arrays of cores so as to sequentially transfer the information through said shift register, means for obtaining output signal pulses from said shift register corresponding to the order in which said "ones" and "zeros" were stored in said first array of cores, said last noted means being operative only when said keying means is withdrawn to render said contactor non-conducting, and means for converting said output signal pulses to a sequence of audible tones, said sequence of tones being representative of the character selected by the depression of said keying means.

7. A code typer for transmitting characters in coded form comprising an array of bistable magnetic cores; keying means having a contactor for each character to be encoded; a winding associated with each contactor and threading a preselected group of cores in said array; means for supplying flux energy to said cores through said winding when said keying means is operated to render said contactor conductive thereby to store either a "1" or a "0" in each core of said preselected group, the character to be encoded thus being represented in binary form in said array of cores; means for shifting said information along said array to produce output pulses corresponding to the order in which said "1's" and "0's" were stored in said cores, the read-out of a "1" producing an output voltage pulse and the read-out of a "0" producing no substantial output; a bistable multivibrator; means for applying said output voltage pulses to said multivibrator to produce a changing D.-C. level at an anode of said multivibrator; an amplifying circuit comprising an amplifier tube having a control grid; a relay responsive to the changing D.-C. level at said anode of said multivibrator; and a transmitter actuable by said relay.

8. A device for translating alphabetical, numerical and like characters into binary form, said device including a plurality of magnetic cores connected electrically in series to form a row, each of said cores being capable of assuming either of two stable states; a separate contactor for each character to be translated; keying means for actuating said contactors successively; a separate read-in winding for each contactor, each of said read-in windings threading in unique manner a combination of cores in said row; means, effective when a contactor is actuated, for supplying current to the associated read-in winding to place each core threaded by said winding in one or the other of its two stable states, thereby to form in said row a unique core-state pattern corresponding to the binary form of the particular character to be translated; and shift means, effective between successive contactor actuations, for shifting said unique pattern serially out of said array to produce a series of output pulses representing in binary form a particular character.

9. In a device for translating alphabetical, numerical and the like characters into coded form; a plurality of magnetic cores serially coupled electrically to form a row, each of said cores being capable of assuming either of two stable states; a separate conductor for each character to be encoded, each conductor threading in a unique manner a combination of said cores, each of said conductors being arranged, when energized, to apply a magnetizing force to different ones of the cores of said combination to form in said row a unique core-state pattern representing in coded form a particular character to be translated; selector means for individually and successively energizing separate ones of said plurality of conductors; and shift means effective between said successive energizations for shifting pulse signals in serial manner from said row, said pulse signals representing in code form the character identified with the particular conductor energized.

10. In a system for translating alphabetical, numerical and like characters into coded form, a plurality of storage devices serially coupled electrically to form a row, each of said storage devices being capable of assuming either of two stable states; a plurality of conductors each connecting differently a combination of said storage devices, each of said conductors being arranged, when energized, to set each of the storage devices of its combination in one state or the other to form in said row a unique storage-state pattern representing in coded form a particular character to be translated; selector means for individually energizing separate of said plurality of conductors; and means effective following said energization for shifting pulse signals in serial manner from said row, said pulse signals representing in code form the character identified with the particular conductor energized.

References Cited in the file of this patent

UNITED STATES PATENTS

| | | |
|---|---|---|
| 2,678,965 | Ziffer et al. | May 18, 1954 |
| 2,704,842 | Goodell et al. | Mar. 22, 1955 |